(12) United States Patent
Dong et al.

(10) Patent No.: US 7,815,164 B2
(45) Date of Patent: Oct. 19, 2010

(54) LOW NOISE VALVE ASSEMBLY

(75) Inventors: Mike Dong, Ann Arbor, MI (US); Kevin Plymale, Canton, MI (US); Mohammad Usman, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 489 days.

(21) Appl. No.: 12/019,238

(22) Filed: Jan. 24, 2008

(65) Prior Publication Data

US 2009/0188573 A1 Jul. 30, 2009

(51) Int. Cl.
*F02M 25/08* (2006.01)
(52) U.S. Cl. ...................... 251/121; 123/521
(58) Field of Classification Search ............ 251/121, 251/122, 124, 129.15; 123/518, 519, 520, 123/521
See application file for complete search history.

(56) References Cited

U.S. PATENT DOCUMENTS

| | | | | |
|---|---|---|---|---|
| 1,502,654 A | * | 7/1924 | Blanchard | 251/122 |
| 1,929,973 A | * | 10/1933 | Haley | 251/122 |
| 1,970,726 A | * | 8/1934 | Barrett | 251/122 |
| 2,880,959 A | * | 4/1959 | Falconer | 251/124 |
| 2,981,290 A | * | 4/1961 | Meyer | 251/122 |
| 3,029,062 A | * | 4/1962 | Thomas | 251/121 |
| 3,198,479 A | * | 8/1965 | Greenwood | 251/121 |
| 3,282,556 A | * | 11/1966 | Hancook | 251/122 |
| 4,114,850 A | * | 9/1978 | Alamprese | 251/122 |
| 4,503,884 A | * | 3/1985 | Spils | 251/122 |
| 4,647,011 A | | 3/1987 | Contzen et al. | |
| 4,688,755 A | * | 8/1987 | Pluviose | 251/121 |
| 4,720,076 A | * | 1/1988 | Hyde | 251/122 |
| 4,967,998 A | * | 11/1990 | Donahue | 251/121 |
| 5,010,923 A | | 4/1991 | Kouda et al. | |
| 5,538,219 A | | 7/1996 | Osterbrink | |
| 5,586,745 A | * | 12/1996 | Knapp | 251/121 |
| 5,967,164 A | * | 10/1999 | Denda et al. | 251/121 |
| 6,517,044 B1 | | 2/2003 | Lin et al. | |
| 6,830,232 B2 | | 12/2004 | Burrola et al. | |

FOREIGN PATENT DOCUMENTS

JP 62-41959 2/1987

* cited by examiner

*Primary Examiner*—John Bastianelli
(74) *Attorney, Agent, or Firm*—Jerome R. Drouillard; Julia Voutyras

(57) ABSTRACT

A low noise valve assembly (24) mitigates noise induced by near sonic gas flow encountering stagnant flow in the region of the valve (24). An inlet tube (10) terminates in an annular chamber (12). An outlet tube (17) has a generally annular valve seat (14) disposed within the chamber (12). The valve (24) moves toward and away from a closed condition in direct contact with the valve seat (14). The valve (24) includes an insert body (26) that is spatially segregated from direct contact with the outlet tube (17) while partially filling the flow channel (16) of the outlet tube (17) when the valve (24) is in its closed condition. The insert body (26) has a generally circular base with a diameter that is larger than the throat diameter (T), which is the internal diameter of the flow channel (16) adjacent the valve (24).

17 Claims, 5 Drawing Sheets

LOW NOISE VALVE ASSEMBLY

CROSS REFERENCE TO RELATED APPLICATIONS

None.

BACKGROUND OF THE INVENTION

1. Field of the Invention

The subject invention relates generally to an electromagnetically actuated valve assembly, and more particularly toward a canister purge valve assembly of the type used for controlling the flow of fuel vapors from a fuel tank to an internal combustion engine.

2. Related Art

A canister purge valve (CPV) is an electromagnetically driven valve that allows fuel vapors that are collected from the fuel tank in a canister to be purged by suction through an engine intake manifold under certain operating modes and conditions. A typical prior art CPV is illustrated in FIG. 1. As shown, the construction includes an inlet tube that leads to a chamber. An outlet tube has an upstanding portion that resides in the chamber and presents a generally annular valve seat for contact by a poppet valve having a flat valve bottom surface to seal the valve seat when in a closed condition. The poppet valve is controlled by an electromagnetic actuator which is schematically depicted in the traditional manner in FIG. 1.

When the valve operates under the timed influence of the electromagnetic actuator, it oscillates quite rapidly, typically in the frequency range of 5-20 Hertz. When the valve operates in this way, two types of noises are observed. One is a ticking noise caused by the opening and closing of the valve. This ticking noise is transmitted into the passenger compartment via hard mounting of the vapor lines. Particularly, the ticking noise is found to occur if the vapor line mounting is made at the front of the floor pan. The other type of noise is a whooshing noise that is caused by the flow of gases through the valve as they are sucked into the engine intake manifold.

The whooshing sound is considered to be particularly troublesome. Noise, vibration and harshness (NVH) concerns during vehicle operation can greatly affect customer satisfaction with the vehicle. Vehicle purchase decisions can be influenced by NVH characteristics. Accordingly, all stray and undesirable noises are a matter of particular concern to vehicle designers and manufacturers.

The current hypothesis is that a shockwave present in the flow of fuel vapors, which passes through the valve, expands into either the vapor line (for in-line mounting) or into the manifold (for direct mounting). Some vehicles have better under hood insulation that prevents this noise from being heard with the hood down or while inside the passenger compartment. A typical complaint, however, is that this predominant whooshing noise is heard when the vehicle hood is open and a person is standing near the engine.

An objectionable noise also occurs during the closing event of the valve, which creates a popping noise that reverberates through the vapor lines. This popping noise phenomenon happens during normal operation, where the engine intake manifold pulls a vacuum on the outlet tube side of the valve. Mechanical analysis, including flow analysis and testing, have demonstrated that failures are caused by flow-induced instability in the valve. Particularly, during the conversion of the momentum energy into potential energy in the gas flow below the flat bottom of the valve and the narrow gap between the valve and the valve seat, a stagnation of flow and separation occurs. The stagnation and separation zones under the valve are significantly unstable and result in local pressure pulsations and noise. These phenomenon are graphically illustrated in FIGS. 2 and 3. During the energy conversion process, i.e., momentum to potential energy, energy dissipation contributes to the aerodynamic noise and mechanical valve vibrations.

Although the prior art has recognized the symptom of objectionable noise, they have taken diverse steps to evade the problem. Primary solutions found in the prior art include steps of isolating the sound emissions from the acoustic source to the intake manifold. For example, there have been proposals to avoid hard mounting of vapor lines to the passenger compartment as a means of isolating flow noises. This is not a solution aimed at preventing the noise from occurring, but merely a method to mask or minimize vibrations which transmit and amplify the noise. Another prior art solution attempts to absorb the sound energy by inserting foam or other acoustic absorbing material at a downstream outlet from the valve. Such proposals are somewhat effective, but do not eliminate the problem and add costs to the overall system.

Likewise, dampers can be added for reducing the probability of sound column resonance. Such muffler and sound dampening strategies are not well suited to practical, real world applications. Furthermore, cost and design complexity issues severely frustrate such approaches.

SUMMARY OF THE INVENTION

Subject invention overcomes the shortcomings and disadvantages found in prior art systems by providing a low noise valve assembly of the type used to control the flow of gases through a conduit while mitigating noise induced by near sonic gas flow encountering stagnant flow in the region of the valve. The assembly comprises an inlet tube terminating in a chamber and an outlet tube having a generally annular valve seat disposed within the inlet tube chamber. A flow channel extends through the valve seat and has a minimum throat diameter immediately downstream of the valve seat. A valve is disposed in the inlet tube chamber for movement toward and away from a closed condition in direct contact with the valve seat. The valve includes an insert body that is spatially segregated from direct contact with the outlet tube while partially filling the flow channel when the valve is in its closed condition. The insert body has a generally circular base with a diameter that is larger than the throat diameter.

According to another, more specific aspect of the invention, a canister purge valve assembly is provided for an internal combustion engine of the type fueled by volatile liquid fuel stored in a fuel tank. The assembly comprises a fuel vapor inlet tube extending from the fuel tank and terminating in a generally annular chamber. An outlet tube has a generally annular valve seat disposed within the inlet tube chamber and a flow channel extending centrally through the valve seat. The flow channel has a minimum throat diameter immediately downstream of the valve seat. The outlet tube is operatively connected to a vacuum inlet of the engine. An elastomeric valve is disposed in the inlet tube chamber for movement toward and away from a closed condition in direct contact with the valve seat. The valve includes an insert body that is spatially segregated from direct contact with the outlet tube while partially filling the flow channel when the valve is in its closed condition. The insert body has a generally circular base with a diameter that is larger than the throat diameter. Furthermore, the insert body extends from the base toward a terminal tip, with the distance between the base and the tip being controlled by the relationship $1.0 \leq D/H \leq 2.0$, where D is the diameter of the base and H is the normal distance between the base and the tip. A valve assembly manufactured according to the subject invention eliminates aerodynamic stagnation and separation from the gas flow immediately downstream of the valve thereby eliminating or substantially reducing the creation of objectionable noises during operation.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
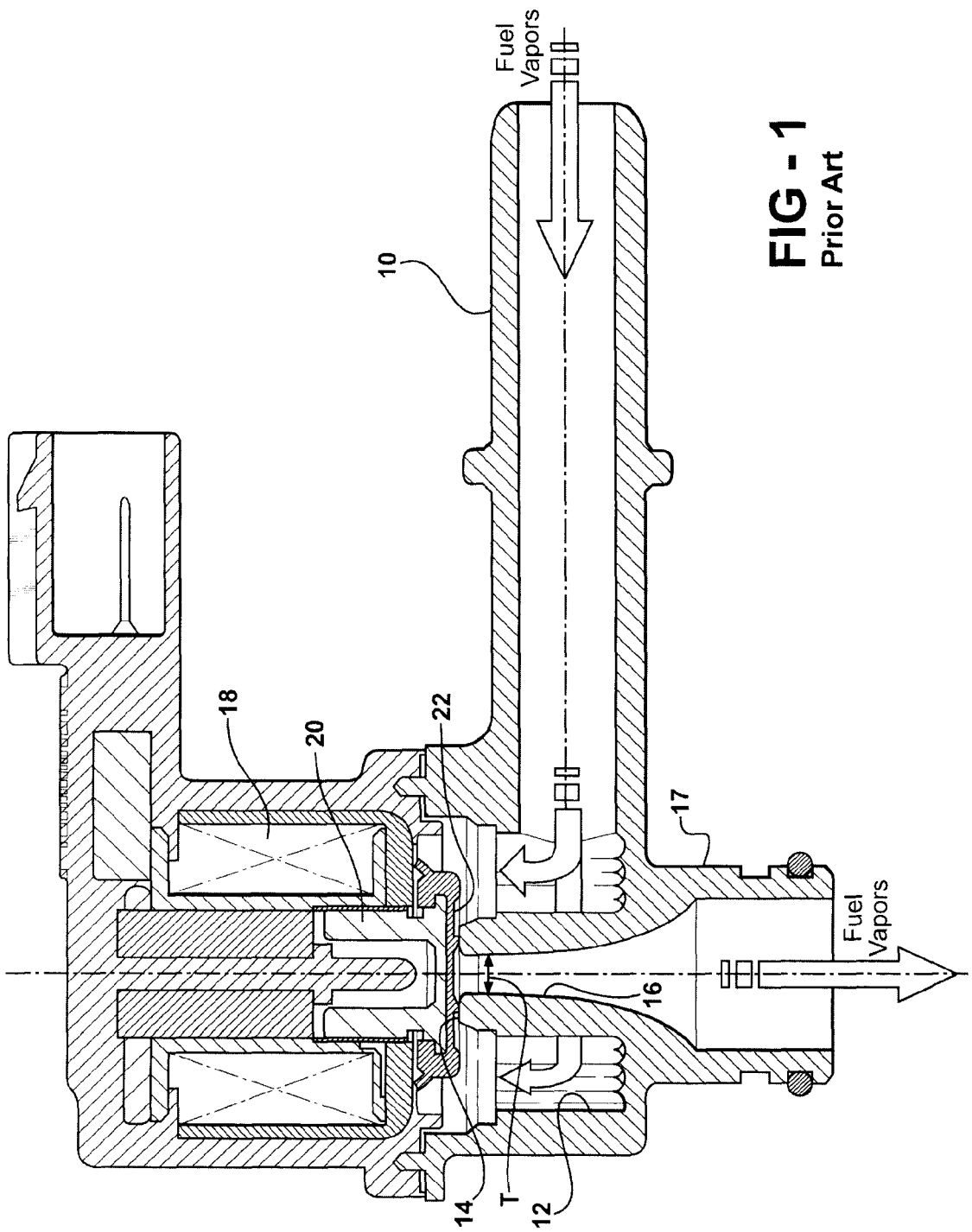
FIG. 1 is a cross-sectional view of a typical prior art CPV valve.
Figure 2:
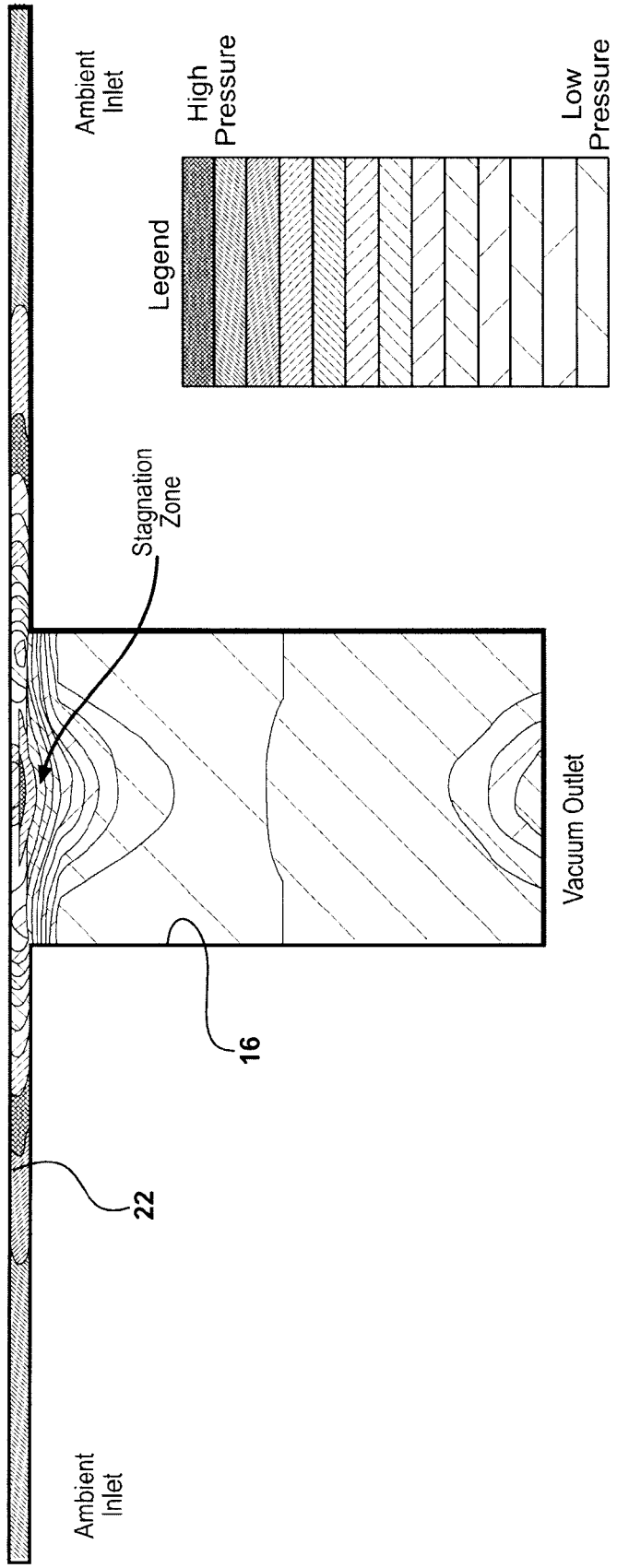
FIG. 2 is a schematic illustration depicting pressure distributions in the cross-sectional flow area of a prior art CPV valve as fuel vapors travel across the valve seat and into the outlet tube.

Referring to the Figures, wherein like numerals indicate like or corresponding parts throughout the several views, a typical prior art CPV valve is generally shown at FIG. 1 including an inlet tube 10 which, although not shown, is of the type which extends in fluid conducting fashion to a fuel tank containing volatile liquid fuel. Commonly, a collection canister will be disposed in line between the CPV valve and the fuel tank. The inlet tube terminates in a generally annular chamber 12. An outlet tube 17 has a generally annular valve seat 14 disposed within the inlet tube chamber 12. Flow channel 16 extends centrally through the valve seat 14. The flow channel 16 has a minimum throat diameter T immediately downstream of the valve seat 14. The throat diameter T eventually widens in diffuser-like fashion as the gas flow is ultimately routed to the vacuum inlet of an internal combustion engine. An electromagnetic valve assembly includes an electromagnetic coil 18 that surrounds an armature 20. The electromagnetic fields created by the coil 18 cause the armature 20 to shift axially toward and away from the valve seat 14. An elastomeric, flat bottomed, poppet-style valve 22 is carried on the end of the armature 20 and positioned so as to make direct contact with the valve seat 14 thereby closing the flow of fuel vapors between the inlet 10 and outlet tubes. However, when the electromagnetic coil 18 is energized to pull the valve 22 away from the valve seat 14, fuel vapors are drawn from the inlet tube 10 across the valve seat 14 and into the flow channel 16, ultimately being sucked into the intake manifold of an engine in well known fashion. Flow velocities in the gas flow between the chamber 12 and flow channel 16 typically approach near sonic levels, e.g., 0.8-0.9 Mach number. At these close-sonic speeds, the momentum in the flowing fuel vapor is substantial.

Figure 3:
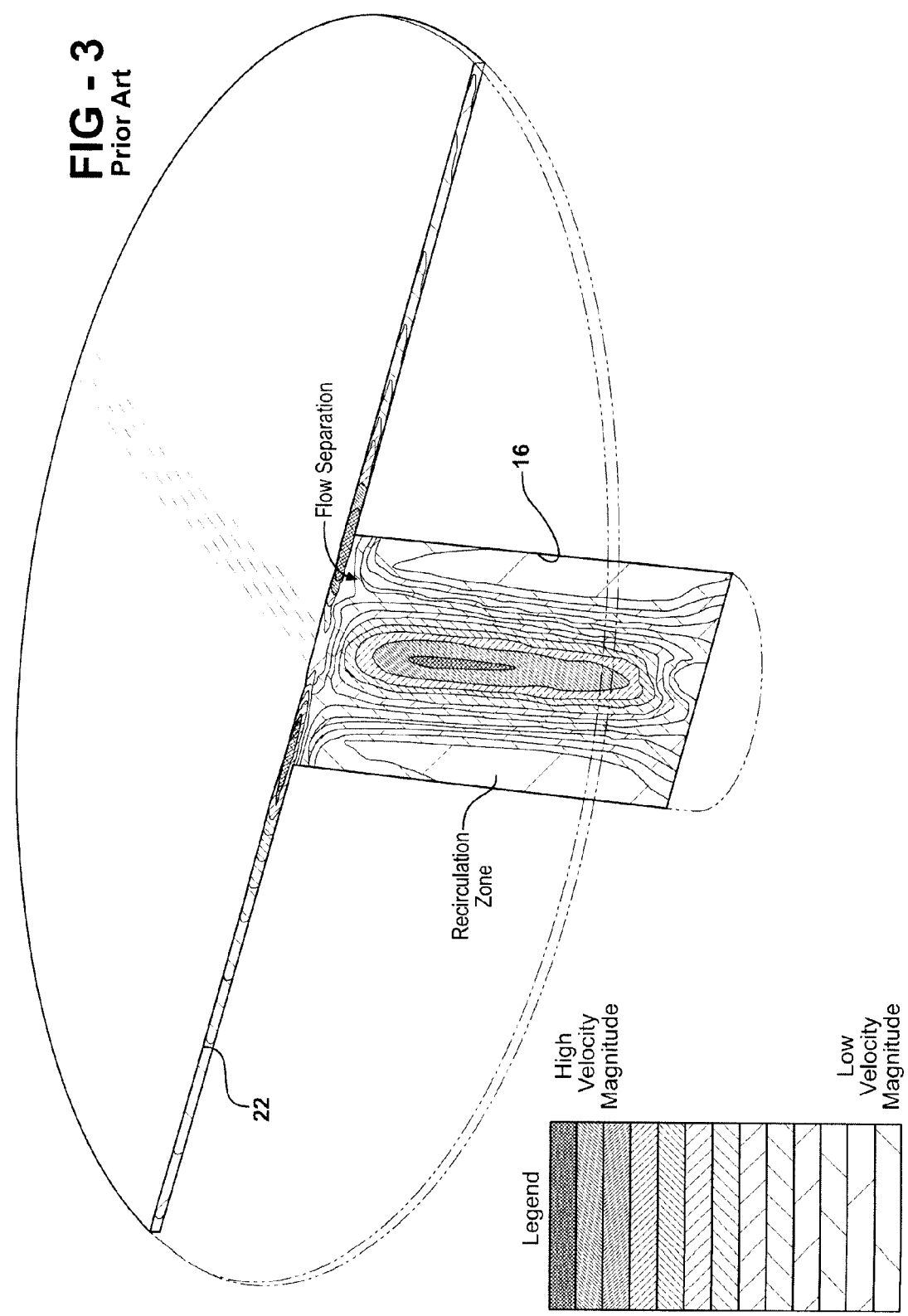
FIG. 3 is a three dimensional depicting velocity magnitude profile showing flow recirculation and separation downstream of the prior art CPV valve outlet tube.

Thus, when the valve 22 moves to an open condition, the running engine forms a vacuum in the flow channel 16. Under this condition, the velocities vectors in the flow channel 16 between the valve 22 and the valve seat 14 are in the radial direction toward the axial symmetry center of the valve seat 14. When the subsonic air/vapor mixing flow jet (roughly Mach number 0.5-0.9) shoots the valve seat center area from the valve gap in a radial direction, flow stagnation occurs under the valve 22 bottom surface in the valve seat cavity. Typically, during the energy conversion from momentum energy to potential energy in a sudden manner, precipitous energy dissipation will occur. This precipitous energy dissipation forms aerodynamic noise and/or mechanical vibrations. As shown in a typical NVH analysis as in FIG. 3, the flow recirculation separation downstream of the valve 22 results in a large scale eddy vortex that is unstable and causes aerodynamic fluctuation in the flow domain. If this fluctuation transmits to a large cavity or chamber, the objectionable whoosh noise may be generated.

Figure 4:
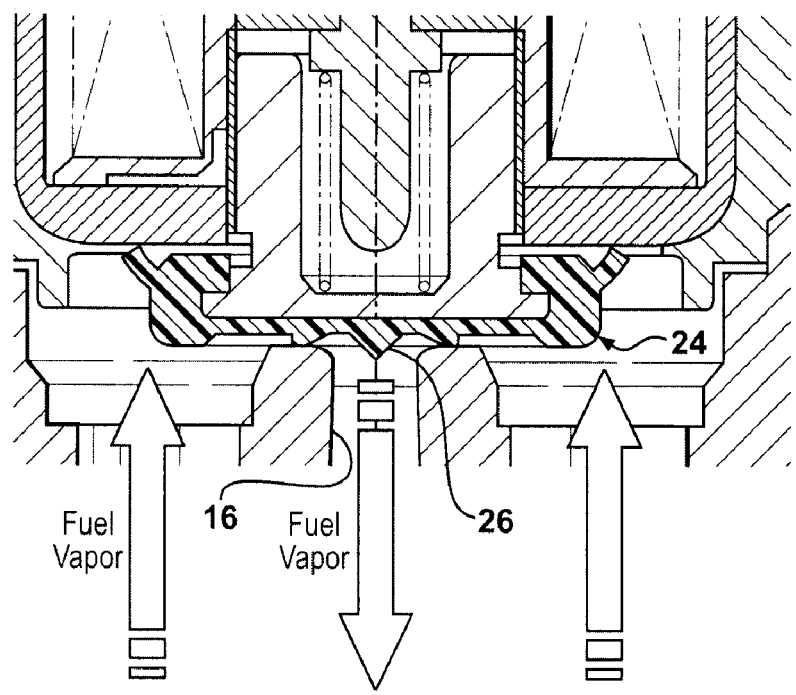
FIG. 4 is a fragmentary cross-sectional view of a CPV valve including an insert body affixed to the underside of the valve member according to the subject invention.
Figure 5:
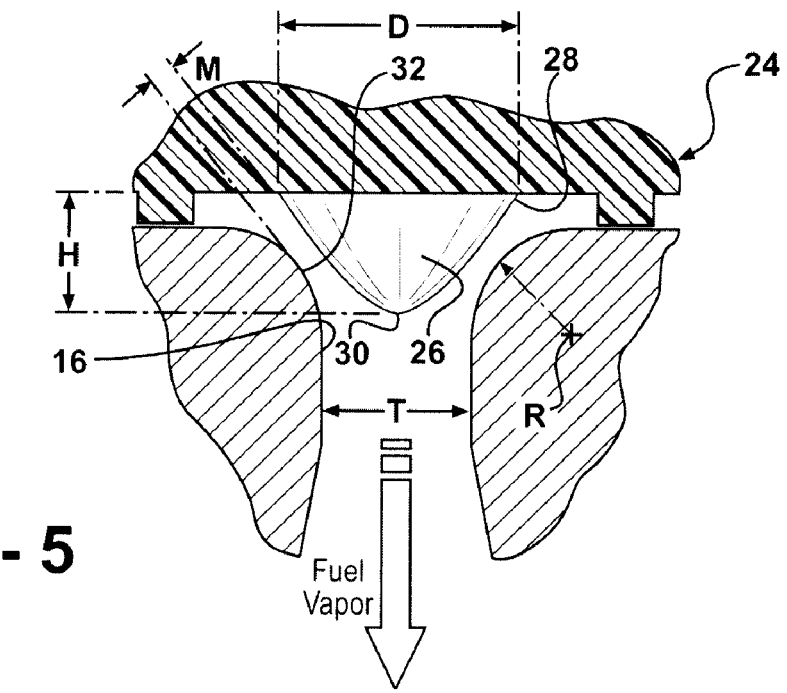
FIG. 5 is a substantially enlarged, fragmentary view depicting an insert body according to the subject invention having a surface configuration defined as a generally circular parabolic body of revolution.

Referring now to FIGS. 4-5, the subject invention is based on an identification of these aerodynamic principles and acoustic phenomenon. According to the invention, the elastomeric valve member, generally indicated at 24, is fitted with an insert body 26 that is spatially segregated from direct contact with the outlet tube 17 while partially filling the flow channel 16 when the valve 24 is in its closed condition. The insert body is configured like a body of revolution, having a generally circular base 28 with a diameter D that is larger than a throat diameter T. Thus, at all times, the insert body 26 is prevented from making contact with the outlet tube 17 and its valve seat 14. Nevertheless, the base 28 of the insert body 26 is larger than the throat diameter T in the flow channel 16. The minimum distance M between the insert body 26 and the outlet tube 17, i.e., when the valve member is in direct contact with said valve seat 14, is preferably controlled by the relationship: $0.2 \leq M/H \leq 0.6$, where H is the height of the insert body 26 as measured from its base 28 to its tip 30. Another preferable dimensional relationship exists between the diameter D of said base 28 and the height H of the insert body 26. More specifically, flow characteristics around the insert body 26 can be effectively managed by controlling its diameter D and height H dimensions according to the mathematical formula: $1.0 \leq D/H \leq 2.0$.

Because the insert body 26 is added to the underside of the valve 24 so as to block out the stagnation zone and to guide the flow of fuel vapors smoothly across and downstream of the valve seat 14, it can be manufactured at minimal cost and without altering the overall design of the CPV valve assembly.

The subject insert body 26 can be manufactured in different geometries. The shape depicted in FIGS. 4 and 5 represents a generally circular parabolic configuration. Alternative shapes include a hemispherical design as illustrated in FIG. 6, wherein like reference numerals are designated with the prefix "1," and a conical design as illustrated in FIG. 7, wherein like reference numerals are designated with the prefix "2." The conical design of FIG. 7 may be truncated so as to form a flattened tip 230 provided, however, that the generally circular diameter of the tip 230 is controlled by the relationship $0 \leq d/H \leq 0.6$, where d is the diameter of the tip 230 and H is the height of the insert body 226.

Figure 6:
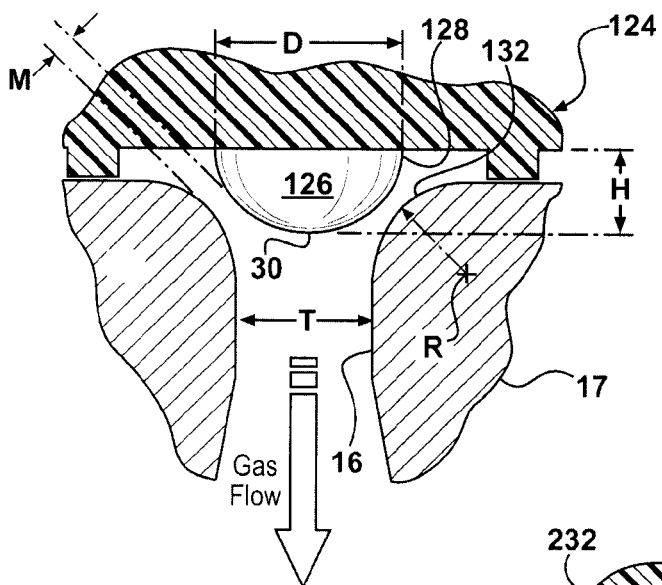
FIG. 6 is a view as in FIG. 5 but depicting an alternative configuration of the insert body, depicted here in a hemispherical shape.

The hemispherical shape insert body 126 of FIG. 6, as in the preceding embodiment, takes the space of sonic flow stagnation in the center of the valve 124. Thus, the flow of fuel vapors are guided along the flow channel formed by the hemisphere and the inner edges of the outlet tube 17.

The transition between the valve seat 14 and flow channel 16 may include a chamfer 32 to help in controlling gas flow. The chamfer 32 may be radiused for this purpose, as depicted in the drawing figures. The radius is preferably controlled by the relationship: $0.3 \leq R/H \leq 1.5$, where R is the radius of the chamfer 32 and H is the height of the insert body 26. By controlling these parameters, the downstream flow velocity can be quickly brought into uniform flow condition, which may beneficially reduce the whooshing noise generation.

Figure 7:
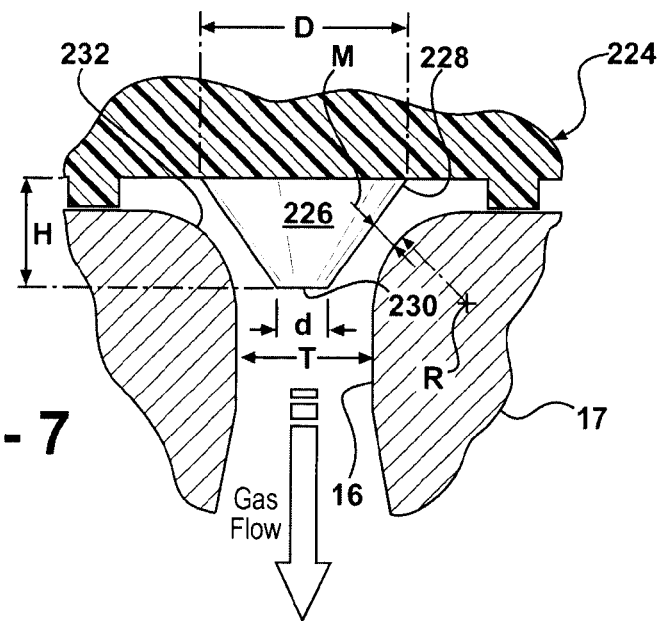
FIG. 7 is a view as in FIG. 5 depicting yet another alternative shape for the subject insert body in the form of a truncated cone.

The conical insert body 226 depicted in FIG. 7 possesses similar functionality to that of the hemispherical design of FIG. 6. Nevertheless, the conical design includes multiple parameters that can be adjusted for optimal performance, including the base diameter D, tip diameter d, and height H. Thus, it becomes more flexible to optimize more flow conditions, such as flow rates, vacuum, air fuel vapor concentrations, and the like. However, if the downstream tip diameter d is too large, a reverse flow region may occur to make recirculation at the valve seat unstable resulting in the undesirable whooshing noise.

Figure 8:
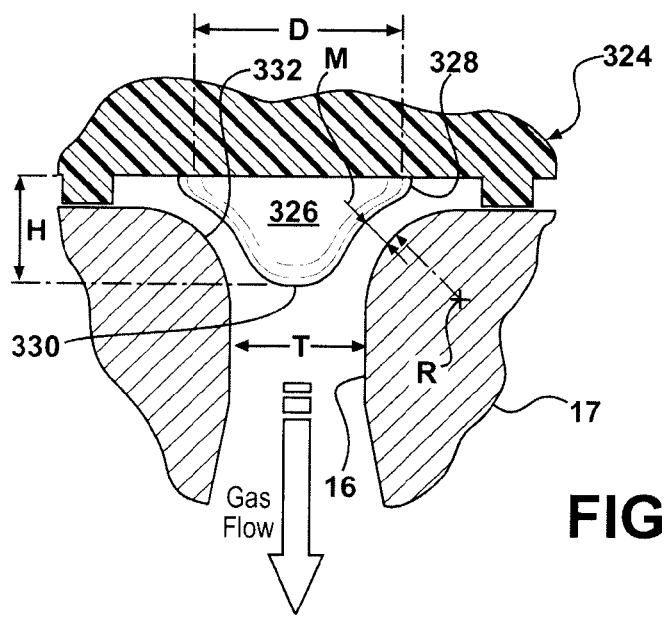
FIG. 8 is a view as in FIG. 5 illustrating yet another embodiment of the invention, wherein the subject insert body has a generally inverted bell shape.

Referring now to FIG. 8, a generally bell-shaped insert body 326 is shown having a concave surface generally matching that of the chamfer 332. In this third alternative embodiment, like reference numerals are designated with the prefix "3." In this embodiment, downstream flow patterns can be more easily controlled which is of importance in mitigating the undesirable whooshing noise. Thus, changes in the shape of the insert body 326 with or without changes to the chamfer 332, can result in downstream flow velocity fuel distribution and controls of the far downstream flow vortex formations. The subsonic vortex is considered to be an important contribution to the whooshing noise, and therefore to be avoided. Experimental tests of the subject invention have proven substantial reductions in the generation of the whooshing noise.

Experimental tests conducted on prototype versions of the invention as depicted in the third alternative embodiment of FIG. 8 have yielded exceedingly favorable results. Operating at a 75% duty cycle, a prior art style CPV (serving as a baseline or control specimen) produced sound pressure levels over 50 db in the frequency range of 8,000-11,000 Hz in all time domain. However, the subject invention in the FIG. 8 configuration exhibited substantially reduced sound pressure levels in the 40's db level for the same frequency ranges. This is a significant reduction in sound pressure generation—approaching 20% improvement. Likewise, testing has indicated that noise levels are similarly reduced for other duty cycles also.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A low noise valve assembly of the type used to control the flow of gases through a conduit while mitigating noise induced by near sonic gas flow encountering stagnant flow in the region of the valve, said assembly comprising:

an inlet tube terminating in a chamber;

an outlet tube having a generally annular valve seat disposed within said inlet tube chamber and a flow channel extending through said valve seat, said flow channel having a minimum throat diameter (T) immediately downstream of said valve seat;

a valve disposed in said inlet tube chamber for movement toward and away from a closed condition in direct contact with said valve seat;

said valve including an insert body spatially segregated from direct contact with said outlet tube while partially filling said flow channel when said valve is in said closed condition, said insert body having a generally circular base with a diameter (D), said base diameter (D) being larger than said throat diameter (T) wherein insert body extends from said base toward a downstream terminal tip, with the normal distance (H) between said base and said tip controlled by the relationship: $1.0 \leq D/H \leq 2.0$, where D is the diameter of said base and H is the normal distance between said base and said tip;

wherein said outlet tube includes a radius of curvature forming a transition between said valve seat and said flow channel, said radius of curvature (R) controlled by the relationship: $0.3 \leq R/H \leq 1.5$.

2. The valve assembly of claim 1 wherein said tip has a generally circular diameter (d), controlled by the relationship: $0 \leq d/H \leq 0.6$.

3. The valve assembly of claim 2 wherein said insert body has a generally conical surface configuration.

4. The valve assembly of claim 1 wherein insert body has a generally hemispherical surface configuration.

5. The valve assembly of claim 1 wherein insert body has a generally parabolic surface configuration.

6. The valve assembly of claim 1 wherein insert body has a generally bell-shaped surface configuration.

7. The valve assembly of claim 1 wherein the minimum distance (M) between said insert body and said outlet tube when said valve is in direct contact with said valve seat is controlled by the relationship: $0.2 \leq M/H \leq 0.6$.

8. The valve assembly of claim 1 wherein valve is elastomeric and includes an annular sealing lip configured to make direct pressing contact with said valve seat of said outlet tube, said annular sealing lip being spaced from said insert body and arranged concentrically relative thereto.

9. The valve assembly of claim 1 further including an electromagnetic valve actuator operatively associated with said valve for moving said valve toward and away from a closed condition in direct pressing contact with said valve seat of said outlet tube.

10. A canister purge valve assembly for an internal combustion engine of the type fueled by volatile liquid fuel stored in a fuel tank, said assembly comprising:

a fuel tank;

a fuel vapor inlet tube extending from the fuel tank and terminating in a generally annular chamber;

an outlet tube having a generally annular valve seat disposed within said inlet tube chamber and a flow channel extending centrally through said valve seat, said flow channel having a minimum throat diameter (T) immediately downstream of said valve seat, said outlet tube operatively connected to a vacuum inlet of the engine;

an elastomeric valve disposed in said inlet tube chamber for movement toward and away from a closed condition in direct contact with said valve seat;

said valve including an insert body spatially segregated from direct contact with said outlet tube while partially filling said flow channel when said valve is in said closed condition, said insert body having a generally circular base with a diameter (D) that is larger than said throat diameter (T), said insert body extending from said base toward a terminal tip, with the normal distance (H) between said base and said tip controlled by the relationship: $1.0 \leq D/H \leq 2.0$, where D is the diameter of said base and H is the normal distance between said base and said tip wherein said outlet tube includes a radius of curvature forming a transition between said valve seat and said flow channel, said radius of curvature (R) controlled by the relationship: $0.3 \leq R/H \leq 1.5$.

11. The valve assembly of claim 10 wherein valve includes an annular sealing lip configured to make direct pressing contact with said valve seat of said outlet tube, said annular sealing lip being spaced from said insert body and arranged concentrically relative thereto.

12. The valve assembly of claim 11 further including an electromagnetic valve actuator operatively associated with said valve for moving said valve toward and away from a closed condition in direct pressing contact with said valve seat of said outlet tube.

13. The valve assembly of claim 12 wherein said tip has a generally circular diameter (d), controlled by the relationship: $0 \leq d/H \leq 0.6$.

14. The valve assembly of claim 13 wherein said insert body has a generally conical surface configuration.

15. The valve assembly of claim 12 wherein insert body has a generally hemispherical surface configuration.

16. The valve assembly of claim 12 wherein insert body has a generally parabolic surface configuration.

17. The valve assembly of claim 12 wherein insert body has a generally bell-shaped surface configuration.

* * * * *